Figures 1, 2:
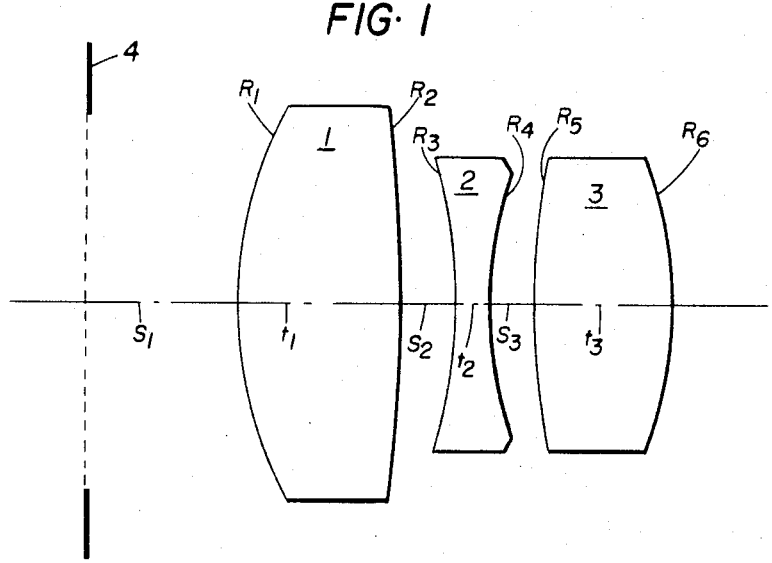

Dec. 19, 1967  M. D. ACKROYD  3,359,057

PHOTOGRAPHIC OBJECTIVE OF THE COOKE TRIPLET TYPE

Filed Dec. 14, 1964

| FOCAL LENGTH - 100 | | | | f/1.9 |
|---|---|---|---|---|
| LENS ELEMENT | $N_1-N_3$ | $V_1-V_3$ | RADIUS | THICKNESS OR SEPARATION |
| DIAPHRAGM | | | | $S_1$ = 22.0 mm |
| 1 | 1.70 | 56 | $R_1$ = 57.4 mm | $t_1$ = 25.5 |
|  |  |  | $R_2$ = -351.0 | $S_2$ = 7.7 |
| 2 | 1.67 | 32 | $R_3$ = -63.3 | $t_2$ = 4.5 |
|  |  |  | $R_4$ = 48.6 | $S_3$ = 6.6 |
| 3 | 1.70 | 56 | $R_5$ = 119.0 | $t_3$ = 19.7 |
|  |  |  | $R_6$ = -53.5 |  |

MURIEL D. ACKROYD
INVENTOR.

BY R. Frank Smith
Leonard W. Treash, Jr.
ATTORNEYS

3,359,057
PHOTOGRAPHIC OBJECTIVE OF THE COOKE TRIPLET TYPE

Muriel D. Ackroyd, Rochester, N.Y., assignor to Eastman Kodak Company, Rochester, N.Y., a corporation of New Jersey
Filed Dec. 14, 1964, Ser. No. 417,994
1 Claim. (Cl. 350—206)

This invention relates to photographic objectives of the Cooke triplet type. More specifically, this invention relates to Cooke triplets which can be used in a fixed focus motion-picture camera.

A lens suitable for a fixed focus motion-picture camera must work at a high aperture and at the same time be quite inexpensive to manufacture. Lenses of the Cooke triplet design have been found adaptable to such demands, see for example U.S. Patent 2,503,751, Litten et al. However, such lenses have the diaphragm in the middle of the lens. For certain cameras it is of considerable advantage to have the diaphragm placed in front of the lens where automatic diaphragm controls are more easily located.

It is the object of this invention to provide a lens which has the diaphragm in front, is inexpensive to manufacture and is well enough corrected to work at an aperture of at least $f/2$.

According to the invention such as objective can be designed by using thick positive elements and placing them quite close to a thin negative element. With this arrangement standard glasses may be used for good corrections at a wide aperture, and the diaphragm may be conveniently placed in front. In addition to the advantage of diaphragm placement, I have found that such a design has at least as high corrections as prior lenses of this type, including excellent corner illumination, while being materially less expensive to manufacture both in regard to the objective itself and the mount.

In the drawings, FIG. 1 is a diagrammatic axial section of a preferred embodiment of the invention, and FIG. 2 is a chart showing the specifications for construction of a lens according to the invention.

In the drawings the lens elements are numbered from front to rear from 1 to 3, the radii from $R_1$ to $R_6$, the separations from $S_1$ and $S_3$ and the thicknesses from $t_1$ to $t_3$. $N_1$ to $N_3$ are the refractive indexes for the D line of the spectrum and $V_1$ to $V_3$ are the dispersive indexes, the diaphragm 4 is placed in front of the objective a distance $S_1$ from the first element.

As used herein, the terms "front" and "rear" shall mean the long conjugate side and the short conjugate side of the objective, respectively.

The invention as generally described above can be described more specifically in terms of the following inequalities where F is the focal length of the objective:

$$t_1 > .2F$$
$$t_2 < .06F$$
$$t_3 > .17F$$
$$S_2 < .1F$$
$$S_3 < .08F$$
$$1.68 < N_1 < 1.71$$
$$1.65 < N_2 < 1.70$$
$$1.68 < N_3 < 1.71$$
$$54 < V_1 < 58$$
$$30 < V_2 < 34$$
$$54 < V_3 < 58$$

An example of the invention can be constructed according to the following specification:

Focal Length=100; $f/1.9$

| Lens Element (diaphragm) | $N_1$-$N_3$ | $V_1$-$V_3$ | Radius (mm.) | Thickness or Separation (mm.) |
|---|---|---|---|---|
| 1 | 1.70 | 56 | $R_1=$ 57.4 | $S_1=22.0$ |
|   |      |    | $R_2=-351.0$ | $t_1=25.5$ |
|   |      |    |              | $S_2=$ 7.7 |
| 2 | 1.67 | 32 | $R_3=-63.3$ | $t_2=$ 4.5 |
|   |      |    | $R_4=$ 48.6 |              |
|   |      |    |              | $S_3=$ 6.6 |
| 3 | 1.70 | 56 | $R_5=$ 119.0 | $t_3=19.7$ |
|   |      |    | $R_6=-53.5$ |              |

The overall length of an objective made according to this example is .64F and the back focus is .71F. Both of these figures represent qualities quite suitable for a motion-picture camera. For such purposes, the above specifications would usually be scaled down to a focal length of between 10 and 20 mm. At such a focal length the lens is well corrected at an aperture of $f/1.9$, especially for chromatic aberration and distortion. It will cover a field of 15° half-angle with a minimum of vignetting (46% illumination at 15° half-angle). It is particularly well suited for a fixed focus camera because the types of glass used and the diaphragm placement give it, as well as its mount, a low manufacturing cost compared to other objectives with similar corrections.

The invention has been described in considerable detail with particular reference to certain preferred embodiments thereof, but it will be understood that certain variations and modificaions can be effected within the spirit and scope of the invention as described hereinbefore and as defined in the appended claims.

I claim:

A photographic objective for placement entirely to the rear of a diaphragm comprising from front to rear a double convex element, a double concave element and a double convex element which complies with the following specifications:

Focal Length=100; $f/1.9$

| Lens Element (diaphragm) | $N_1$-$N_3$ | $V_1$-$V_3$ | Radius (mm.) | Thickness or Separation (mm.) |
|---|---|---|---|---|
| 1 | 1.70 | 56 | $R_1=$ 57.4 | $S_1=22.0$ |
|   |      |    | $R_2=-351.0$ | $t_1=25.5$ |
|   |      |    |              | $S_2=$ 7.7 |
| 2 | 1.67 | 32 | $R_3=-63.3$ | $t_2=$ 4.5 |
|   |      |    | $R_4=$ 48.6 |              |
|   |      |    |              | $S_3=$ 6.6 |
| 3 | 1.70 | 56 | $R_5=$ 119.0 | $t_3=19.7$ |
|   |      |    | $R_6=-53.5$ |              | wherein $R_1$ to $R_6$ are the radii of curvature, $t_1$ to $t_3$ are the thicknesses, $S_1$ to $S_3$ are the air separations, $N_1$ to $N_3$ are the indexes of refraction for the D line of the spectrum, and wherein $V_1$ to $V_3$ are the dispersive indexes.

No references cited.

JEWELL H. PEDERSEN, *Primary Examiner.*

R. J. STERN, *Assistant Examiner.*